Jan. 29, 1935.　　　G. G. LANDIS ET AL　　　1,989,654
ELECTRIC WELDING APPARATUS
Filed Jan. 9, 1933　　　3 Sheets-Sheet 1

INVENTORS.
George G. Landis and
BY　Frank Malner

Fay, Oberlin & Fay
ATTORNEYS.

INVENTORS.
George G. Landis and
BY Frank Malner
Fay, Oberlin & Fay
ATTORNEYS

Jan. 29, 1935.  G. G. LANDIS ET AL  1,989,654
ELECTRIC WELDING APPARATUS
Filed Jan. 9, 1933   3 Sheets-Sheet 3

INVENTORS.
George G. Landis and
BY Frank Malner

Fay, Oberlin & Fay
ATTORNEYS.

Patented Jan. 29, 1935

1,989,654

UNITED STATES PATENT OFFICE 1,989,654

ELECTRIC WELDING APPARATUS

George G. Landis, Cleveland, and Frank Malner, Euclid Village, Ohio, assignors to The Lincoln Electric Company, Cleveland, Ohio, a corporation of Ohio Application January 9, 1933, Serial No. 650,754

4 Claims. (Cl. 105—177)

This invention relates as indicated to electric welding apparatus and more particularly to apparatus designed to be used in welding or repairing rails of a railroad and the like.

This invention relates more particularly to the means for supporting any well known form of electric welding apparatus on rails in such a manner that the apparatus may be easily and quickly removed from the rails of the main line so that the welder will not interfere with the traffic or signal system of such main line. Other objects of this invention will appear as the description proceeds.

To the accomplishment of the foregoing and related ends, said invention, then consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1:
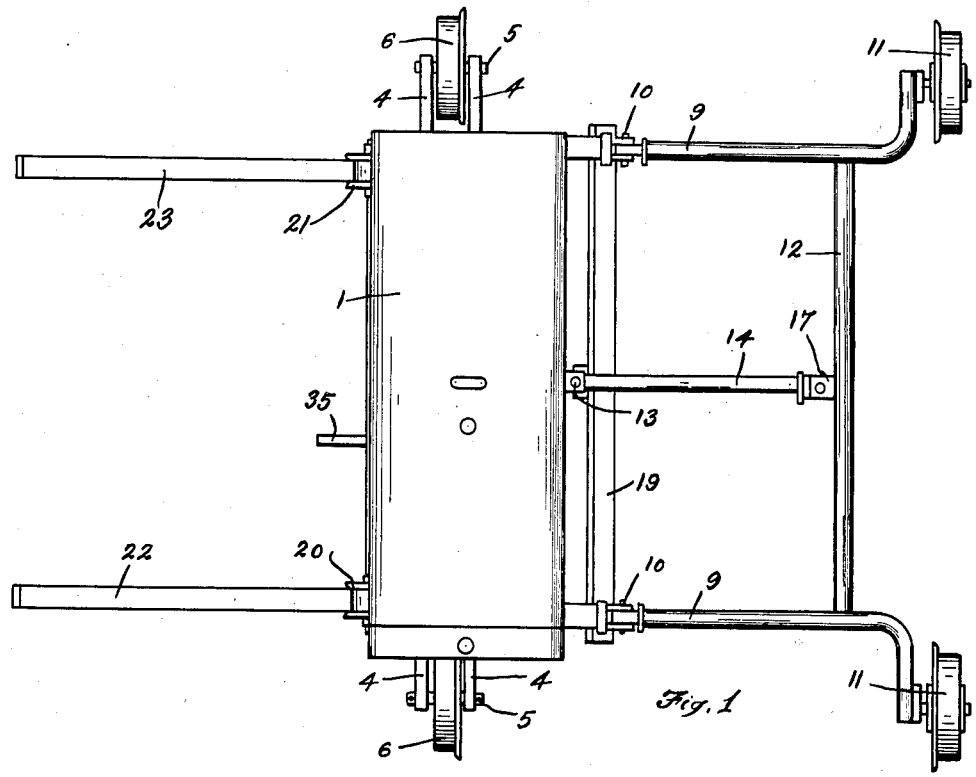
Figure 2:
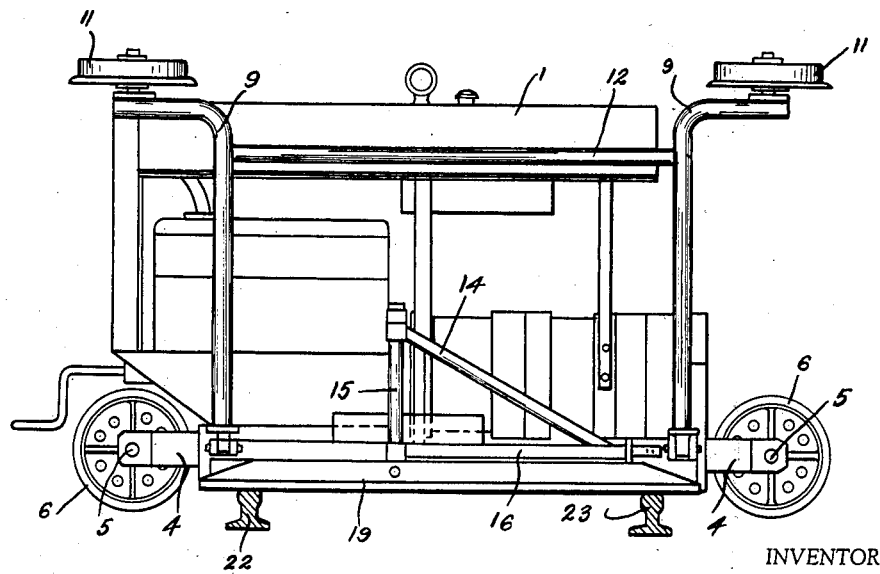
Figure 3:
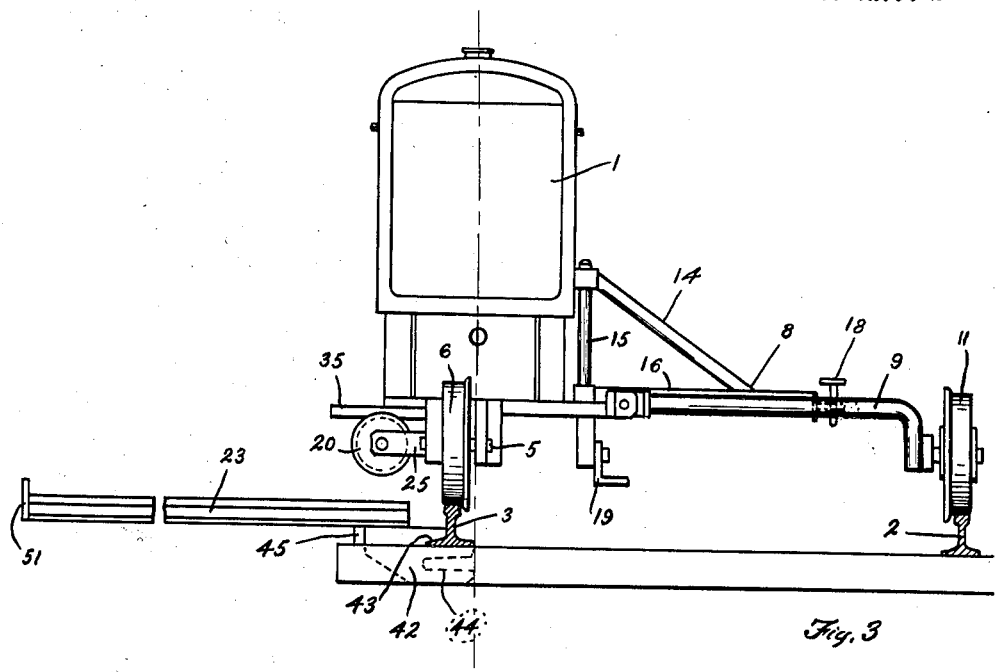
Figures 4, 8:
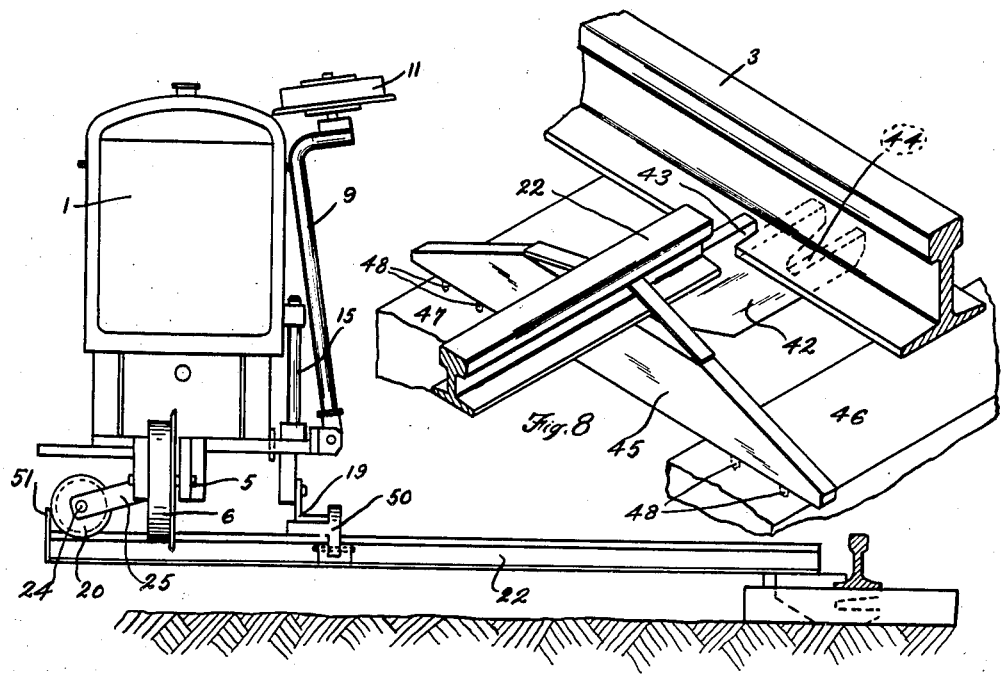
Figure 5:
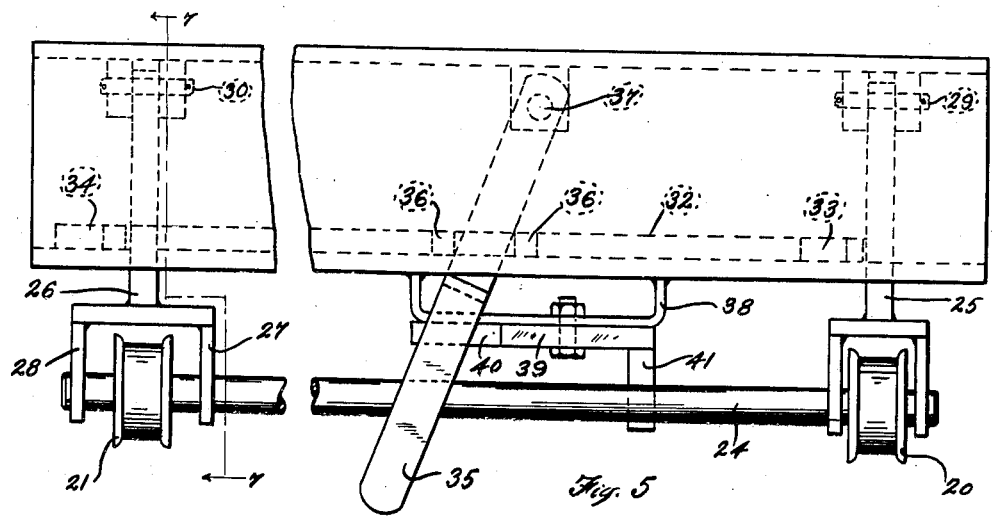
Figure 6:
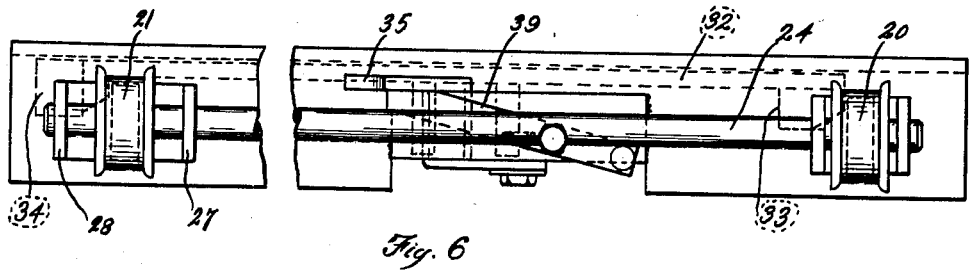
Figure 7:
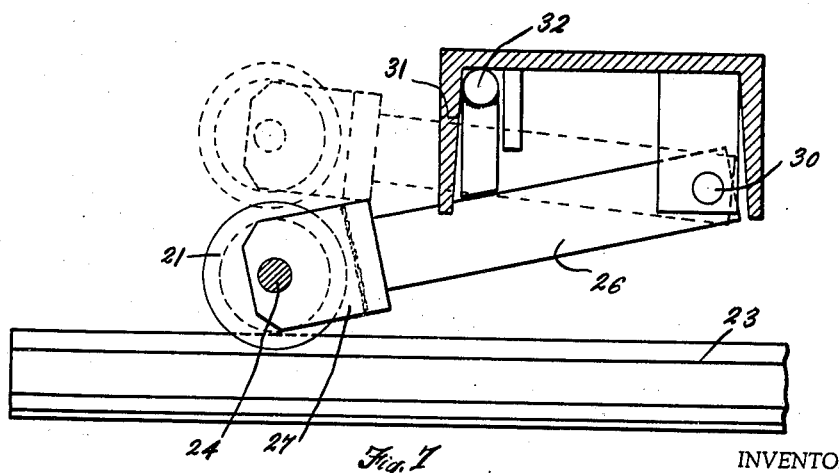

Figure 1 is a plan view of an apparatus constructed according to this invention; Figure 2 is a side elevational view of such apparatus; Figure 3 is an end elevational view of the apparatus illustrated in the previous figures showing the same positioned upon the rails of the main track; Figure 4 is an end elevational view of the apparatus such as is illustrated in Figure 3 but positioned on the auxiliary or laterally extending rails; Figure 5 is a fragmentary broken plan view of a portion of the apparatus illustrated in the previous figures disclosing particularly the construction and means of support for the wheels which carry the welder when positioned on the auxiliary rails; Figure 6 is a side elevational view of the apparatus illustrated in Figure 5; Figure 7 is a transverse sectional view of that portion of the apparatus illustrated in Figure 5 taken on a plane substantially indicated by the line 7—7; and Figure 8 is a fragmentary perspective view of one end of an auxiliary rail showing the manner in which the same is connected to and supported by a rail of the main track.

Referring now more specifically to the drawings and more especially to Figures 1 to 4, it should first be noted that this invention relates to the means for supporting any suitable electric welding apparatus which is generally indicated in the figures at 1 and which, forming no part of this invention, will not be described in further detail.

The welding apparatus 1 may be employed for the purpose of welding or repairing rails which requires that such apparatus be easily and quickly removed from the main line rails 2 and 3 so as not to interfere with the traffic or signal system of such main line. The invention, therefore, relates as above indicated to the means for supporting the welding apparatus on the main track and by which removal of such apparatus from the main track onto auxiliary rails arranged at right angles to the main track is facilitated.

The sub-frame supporting the welding apparatus has brackets generally indicated at 4 extending therefrom carrying axles 5 on which are mounted flanged wheels 6. As most clearly illustrated in Figure 3 the flanged wheels 6 are supported on a line spaced for a short distance at one side of a vertical line generally indicated at 7 extending through the center of gravity of the welding apparatus considered as a unit apart from the supporting structure.

The welding apparatus is supported on the opposite rail 2 by a hinged frame structure generally indicated at 8 which comprises spaced laterally extending arms 9 which, at their inner ends, are pivotally secured as at 10, to the sub-frame of the welder and at their outer ends rotatably support wheels 11 adapted to rest upon the rail 2. The arms 9 are tied together and cross-braced by means of a longitudinally extending bar 12.

Pivotally secured on a vertical axis at 13 on the welding apparatus is a triangular bracing frame consisting of members 14, 15 and 16 as most clearly illustrated in Figure 2. The outer end of the frame member 16 is adapted to be engaged by a bifurcated lug 17 mounted on the rod 12 and to be secured in such lug by means of a removable pin 18, most clearly illustrated in Figure 3.

The sub-frame of the welding apparatus carries a longitudinally extending bracket generally indicated at 19 for the purpose hereinafter more fully explained.

Likewise secured to the sub-frame of the welding apparatus are spaced auxiliary wheels 20 and 21 which are adapted to assist in supporting the welding apparatus when the same has been moved off from the main line onto laterally extending auxiliary rails 22 and 23. The arrangement and supporting means for the auxiliary wheels 20 and 21 is most clearly illustrated in Figures 5, 6 and 7. By having reference to these last named figures, it will be noted that the wheels 20 and 21 are carried by an axle 24 which is supported at its ends by pivoted brackets 25 and 26. The auxiliary wheel 21 is slidably mounted on the shaft 24 intermediately of the spaced ends 27 and 28 of the bracket 26 so as to allow for variations in the space between the auxiliary rails 22 and 23. The apparatus for supporting the auxiliary wheels is designed so that when the welding apparatus is positioned on the main track and being moved therealong, such auxiliary wheels may be moved upwardly for a short distance and held in such upward position so as not to interfere with guard rails, crossing rails and the like associated with the main line.

The brackets 25 and 26 which support the auxiliary wheels 20 and 21 are pivotally secured by means of pins 29 and 30 to the sub-frame of the welder and such brackets extend through slots generally indicated at 31 in the outer flange of the sub-frame which assists in laterally supporting such brackets. The sub-frame also carries a slide generally indicated at 32 which, at its opposite ends, carries wedge blocks 33 and 34. The slide 32 is reciprocated axially by means of a lever 35 which extends between abutments 36 on such slide and is pivoted as at 37 to the sub-frame of the welder.

The sub-frame of the welder also carries a laterally extending bracket 38 which pivotally supports a lever 39 at one end 40 extending under the lever 35 and at its other end 41 extending under the shaft or axle 24.

As previously indicated, the apparatus comprising this invention includes two auxiliary rails 22 and 23 which are adapted to support the welding apparatus in a position laterally removed from the main line of the railroad so that when the apparatus is in such position, the welding operation may proceed without interfering with the traffic or signal system of the main line. When the welding apparatus is being moved along the main line by towing or otherwise, such rails will be positioned on the hinged frame generally indicated at 8 which assists in shifting the center of gravity of the entire apparatus for a distance sufficient to the right of rail 3 so that the entire apparatus may be safely moved along the main track at relatively high speeds.

As most clearly illustrated in Figures 3 and 8, the auxiliary rails 22 and 23 are at one end provided with bracket members 42 which may be welded or similarly secured to the end or bottom of the rails 22 and 23 and which are provided with a plurality of recesses generally indicated at 43 and 44, each of which may selectively engage the base of the rail 3 of the main line.

Secured to the bottom of the auxiliary rails are transversely extending abutments 45 which are adapted to span and rest upon two ties such as 46 and 47 of the main line and in order to insure that the rails will be held in proper position, lugs, such as 48, may be provided on the bottom surface of the abutments 45 so as to dig into the ties 46 and 47. When this means of supporting the auxiliary rails is employed, such rails in effect become cantilever beams so that it is not necessary to provide any additional means of support for the apparatus at the side of the main track. The provision of two rail base-engaging recesses such as 43 and 44 in the plate 42 enables the auxiliary rails to be employed with various heights of main rails so that the upper surface of the auxiliary rails may be brought into suitable relationship with the upper surface of the main rail 3.

The operation of the above described apparatus is briefly as follows:—When the welder is positioned on the rails of the main line, the parts will occupy the position substantially as illustrated in Figure 3 with the exception that the auxiliary rails 22 and 23 will, as previously indicated, be supported on the hinged frame 8. It should be noted at this point that the bracket 19, as well as the auxiliary wheels 20 and 21, are at a sufficient distance above the ties of the main line so as not to interfere with crossings, frogs, etc.

Assuming now that it is desirable to remove the welding apparatus from the main rails in order to clear the main right of way, the first step is to remove the auxiliary rails 22 and 23 from their position on the hinged frame 8 into the position illustrated in Figures 3, 4 and 8. The lever 35 as illustrated in Figures 5 and 6 will then be moved to the right which moves such lever off from the face 40 of the lever 39 permitting the axle 24 to descend due to its own weight by pivoting about the pins 29 and 30. The brackets 25 and 26 are locked in their depressed position by the lever 35 simultaneously moving the slide 32 to the right until the locking wedges 33 and 34 move into position between the brackets 25 and 26 and the bottom of the sub-frame as most clearly illustrated in Figure 7.

With the auxiliary wheels moved to the lower position as just described, the operator may then grasp the rod 12 of the hinged frame and tip the welding apparatus back onto the auxiliary wheels which will rest on the auxiliary rails. The relationship of the auxiliary wheels with respect to the center of gravity of the apparatus is such that one man may easily wheel the apparatus back into the position illustrated in Figure 4. Secured to the auxiliary rails intermediately of their ends are hinged lugs generally indicated at 50 which are rotated into position on the auxiliary rails so as to be engaged by the bracket 19, which supports the welding apparatus in proper vertical position and insures against such apparatus rolling back onto the main line. The auxiliary wheels 20 and 21 are prevented from running off from the ends of the auxiliary rails 22 and 23 by lugs such as 51 provided on the ends of the auxiliary rails, which lugs have the added function of assisting in holding the auxiliary rails on the hinged frame when such rails are not in use.

In order that the hinged frame 8 and the wheels 11 will not obstruct the main line against passage of trains thereover, such frame may be moved into the position illustrated in Figure 4 by first withdrawing the pin 18, rotating the triangular frame consisting of members 14, 15 and 16 in a counterclockwise direction as viewed in Figure 1 until such frame occupies the position as illustrated in Figure 2. Thereupon, the frame 8 may be rotated in a counterclockwise direction as viewed in Figure 3 until it is brought into the position illustrated in Figure 4 where the center of gravity of the wheels 11 will be to the left of the pivot points 10 so as to rest in the position illustrated in Figure 4 without further means of support.

From the above description, it will be apparent that the apparatus comprising our invention permits the ready removal from the main line of the usual welding apparatus with such facility that one man may unassisted accomplish this result. Furthermore, the employment of cantilever rails for supporting the welding apparatus when moved off from the main line permits the welder to be supported in a position laterally removed from the main line without the necessity of any other support, which would be impossible to secure in positions such as on bridges and the like. Furthermore, the positioning of the auxiliary rails on the hinged frame provides sufficient ballast for the apparatus so that the welder may be towed or similarly moved along the main line at relatively high speeds. The important feature of the invention which should not be lost sight of is that one man may very quickly and with little effort move the entire welding apparatus off from the main line so as not to interfere with the traffic or signal system of the right of way.

Other modes of applying the principle of our invention may be employed instead of the one explained, change being made as regards the mechanism herein disclosed, provided the means stated by any of the following claims or the equivalent of such stated means be employed.

We, therefore, particularly point out and distinctly claim as our invention:

1. The combination with an electric arc welding apparatus, of means for movably supporting such apparatus on main spaced rails and means for supporting such apparatus on auxiliary spaced rails arranged in angular relation to said first named rails, said last named means comprising spaced wheels in substantial alignment with the longitudinal axis of said apparatus on one side thereof, and a rail engaging bracket on the opposite side thereof.

2. The combination with an electric arc welding apparatus, of means for movably supporting such apparatus on main spaced rails and means for supporting such apparatus on auxiliary spaced rails arranged in angular relation to said first named rails, said first named means comprising a plurality of wheels secured to such apparatus so as to engage one of said main rails, a frame hinged to said apparatus and extending to the other of said main rails, and a wheel on said frame adapted to engage said other main rail, said last named means comprising spaced wheels in substantial alignment with the longitudinal axis of said apparatus on one side thereof, and a rail engaging brackets on the opposite side thereof.

3. The combination with an electric arc welding apparatus, of means for movably supporting such apparatus on main spaced rails and means for supporting such apparatus on auxiliary spaced rails arranged at substantially right angles to said first named rails, said first named means comprising a plurality of wheels secured to such apparatus in substantial alignment with the longitudinal axis thereof and at one side of a vertical line through the center of gravity of such apparatus and adapted to engage one of said main rails, a frame hinged to said apparatus and extending to the other of said main rails, and a wheel on said frame adapted to engage said other main rail, said last named means comprising spaced wheels in substantial alignment with the longitudinal axis of said apparatus on one side thereof, and a rail engaging bracket on the opposite side thereof.

4. A portable electric arc welding apparatus comprising a main assembly including a base frame, means including paired wheels on said frame with the axes of such paired wheels arranged at right angles to each other and so closely adjacent the vertical axis of said assembly when in an upright position that such assembly may by being only slightly tipped moved from one to the other of pairs of tracks likewise arranged at right angles to each other, and an auxiliary frame hinged to said assembly about an axis substantially parallel to the longitudinal axis of the assembly, said auxiliary frame likewise carrying track-engaging wheels and foldable about its securing axis into a substantially vertical position closely adjacent to one side of said main assembly.

GEO. G. LANDIS.
FRANK MALNER.